US011373346B1

(12) United States Patent
Bakshi et al.

(10) Patent No.: US 11,373,346 B1
(45) Date of Patent: Jun. 28, 2022

(54) ANIMATED TRANSITIONS BETWEEN GRAPHS

(71) Applicant: Google LLC, Mountain View, CA (US)

(72) Inventors: Nikhil Bakshi, Mountain View, CA (US); Zev Nettleton Youra, Mountain View, CA (US); Michael Goderbauer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 428 days.

(21) Appl. No.: 16/223,299

(22) Filed: Dec. 18, 2018

Related U.S. Application Data (63) Continuation of application No. 15/383,982, filed on Dec. 19, 2016, now Pat. No. 10,169,890, which is a continuation of application No. 15/005,546, filed on Jan. 25, 2016, now Pat. No. 10,109,086.

(51) Int. Cl.
| | | |
|---|---|---|
| *G06T 11/20* | (2006.01) | |
| *G06T 11/00* | (2006.01) | |
| *G06T 13/80* | (2011.01) | |
| *G06F 40/14* | (2020.01) | |

(52) U.S. Cl.
CPC ............ G06T 11/206 (2013.01); G06F 40/14 (2020.01); G06T 11/001 (2013.01); G06T 13/80 (2013.01)

(58) Field of Classification Search
None
See application file for complete search history.

(56) References Cited

U.S. PATENT DOCUMENTS

| | | |
|---|---|---|
| 6,728,724 B1 | 4/2004 | Megiddo et al. |
| 7,737,979 B2 | 6/2010 | Robertson et al. |
| 8,531,451 B2 | 9/2013 | Mital et al. |
| 8,914,740 B1 | 12/2014 | Joos et al. |
| 9,786,068 B2 * | 10/2017 | Ishii ................. A61B 6/486 |
| 2005/0122325 A1 | 6/2005 | Twait |
| 2008/0036767 A1 | 2/2008 | Janzen |
| 2008/0192056 A1 | 8/2008 | Robertson et al. |
| 2009/0058863 A1 | 3/2009 | Avkarogullari et al. |

(Continued)

OTHER PUBLICATIONS

Heel et al., "Animated Transitions in Statistical Data Graphics" (Year: 2007).*

(Continued)

*Primary Examiner* — Hilina K Demeter
(74) *Attorney, Agent, or Firm* — Fish & Richardson P.C.

(57) ABSTRACT

Methods, systems, and apparatus, including computer programs encoded on a computer storage medium, for generating and presenting animated graphs. In one aspect, a method includes updating a user interface to present a first graph representing a set of data corresponding to a time period. The first graph includes a heat map that visually depicts different values of the data for different sub-time periods of the time period using different colors. The heat map includes visual graph elements that each represents a respective sub-time period and depicts a particular color based on the value for the respective sub-time period. The user interface is updated to replace the presentation of the first graph with a presentation of a second graph representing a sum of the different values over the time period. The updating includes animating a transition between the presentation of the first graph and the presentation of the second graph.

20 Claims, 4 Drawing Sheets

(56) References Cited

U.S. PATENT DOCUMENTS

| | | |
|---|---|---|
| 2011/0084967 A1 | 4/2011 | De Pauw et al. |
| 2012/0089920 A1 | 4/2012 | Eick |
| 2012/0280991 A1 | 11/2012 | Maloney et al. |
| 2012/0313949 A1 | 12/2012 | Rope et al. |
| 2013/0002675 A1 | 1/2013 | Hicks et al. |
| 2014/0033120 A1 | 1/2014 | Bental et al. |
| 2014/0043340 A1 | 2/2014 | Sobhy et al. |
| 2014/0078151 A1 | 3/2014 | Garr et al. |
| 2015/0161805 A1 | 6/2015 | Glazer et al. |
| 2015/0170382 A1* | 6/2015 | Bhatia .................... G06Q 40/00 345/440 |
| 2015/0213631 A1 | 7/2015 | Vander Broek |
| 2015/0310648 A1* | 10/2015 | Matange ................ G06Q 10/00 345/440 |
| 2016/0140146 A1* | 5/2016 | Wexler .................... G06F 16/50 707/741 |
| 2016/0266766 A1* | 9/2016 | Peev .................. G06F 3/04815 |
| 2016/0267700 A1* | 9/2016 | Huang .................. G06F 40/166 |
| 2016/0275707 A1* | 9/2016 | Kuroda .................. G06T 11/206 |
| 2016/0379391 A1* | 12/2016 | Rowell .................. G06T 11/206 345/440 |
| 2017/0076471 A1* | 3/2017 | Prophete ............... G06F 40/137 |
| 2017/0154089 A1* | 6/2017 | Sherman ................. G06F 16/54 |

OTHER PUBLICATIONS

Heer et al., "Animated Transition in Statistical Data Graphics" (Year: 2007).*

* cited by examiner

ANIMATED TRANSITIONS BETWEEN GRAPHS

CROSS-REFERENCE TO RELATED APPLICATIONS

This application is a continuation application of, and claims priority to, U.S. patent application Ser. No. 15/383,982, titled "ANIMATED TRANSITIONS BETWEEN GRAPHS," filed on Dec. 19, 2016, which application is a continuation application of, and claims priority to, U.S. patent application Ser. No. 15/005,546, titled "ANIMATED GRAPHS," filed on Jan. 25, 2016. The disclosures of the foregoing applications are incorporated herein by reference in their entirety for all purposes.

BACKGROUND

Users access many types of information over electronic networks. An example of information accessed over electronic networks include reporting information, which can be presented in the form of charts, graphs, and/or heat maps. A heat map is graph that uses colors to represent different data values.

SUMMARY

This specification describes technologies relating to generating and presenting animated graphs.

In general, one innovative aspect of the subject matter described in this specification can be embodied in methods that include the actions of updating a user interface to present a first graph representing a set of data corresponding to a time period, where the first graph includes a heat map that visually depicts different values of the data for different sub-time periods of the time period using different colors and where the heat map includes a set of visual graph elements that each represents a respective sub-time period and depicts a particular color based on the value for the respective sub-time period; and updating the user interface to replace the presentation of the first graph with a presentation of a second graph representing a sum of the different values over the time period, including animating a transition between the presentation of the first graph and the presentation of the second graph, the animating of the transition comprising: determining, based on the sum of the different values, a final location for each visual graph element within a geometric shape of the second graph, wherein the visual graph elements are arranged to form the geometric shape during the presentation of the second graph; determining, for at least a subset of the visual graph elements, a distance and direction to move the visual graph element based on a location of the visual graph element in the first graph and the final location of the visual graph element within the geometric shape; and during a transition time period, moving each visual graph element in the subset from the location of the visual graph element in the first graph to the final location of the visual graph element in the geometric shape. Other embodiments of this aspect include corresponding systems, apparatus, and computer programs, configured to perform the actions of the methods, encoded on computer storage devices.

These and other embodiments can each optionally include one or more of the following features. In some aspects, the geometric shape can include a bar of a bar graph and has a size that corresponds to the sum of the different values. In some aspects, each visual graph element can be a Document Object Model (DOM) element.

In some aspects, the final location within the geometric shape of each visual graph element for the time period can be further based on the location of the visual graph element in the first graph. In some aspects, the animating of the transition includes determining a final color for the geometric shape and during the transition time period, adjusting the color of each visual graph element until the color of the visual graph element matches the final color for the geometric shape.

In some aspects, the animating of the transition can include determining, based at least on the sum of the different values, a final size of each visual graph element in the geometric shape. The final size for at least a portion of the visual graph elements can be different from a size of the visual graph element in the first graph. During the transition time period, the size of each visual graph element in the portion of visual graph elements can be adjusted until the visual graph element reaches the final size for the visual graph element.

In some aspects, the final size of a given visual graph element can be based on a ratio between the value represented by the given visual graph element the sum of the different values. In some aspects, moving each visual graph element in the subset from the location of the visual graph element in the first graph to the final location of the visual graph element in the geometric shape can include moving the visual elements so that the visual graph elements appear to move together as the visual graph elements approach a location of the geometric shape in the second graph.

Particular embodiments of the subject matter described in this specification can be implemented so as to realize one or more of the following advantages. Animated graphs can present data for different time periods (or other different data dimensions) in a way that better illustrates the relationship (e.g., relative values) between the data for the different time periods. In this way, the data can be displayed in a more meaningful way and in a way that is more easily understood by users. For example, by increasing the size of visual graph elements that represent higher values while decreasing or maintaining the size of visual graphs elements that represent lower values during a transition from a heat map to a bar of a bar graph, the relative contribution of the value represented by each visual graph element to the total value represented by the bar can be easily seen and understood by users.

By making certain calculations, the animation can more smoothly transition between a first view that presents data of a single data dimension and a second view that presents data for multiple data dimensions. In addition, the transition is made more smoothly by adjusting the color of individual graph elements as they move towards their final position in the first or second view. The animated transitions can also provide aesthetic advantages by providing a visually satisfying transition to users viewing the graphs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system can generate and provide animated graphs that animate the transition between different views of data. For example, the transition between a heat map in which data for multiple data dimensions is presented and a bar graph in which data for a single data dimension is presented can be animated by moving visual graph elements from a respective location in the heat map to a respective location in the bar graph (and from a respective location in the bar graph to a respective location in the heat map). The data dimensions can be time-based dimensions, geography-based dimensions, or other appropriate types of data dimensions. For example, an animated graph may animate the transition between a first view in which a heat map depicts data for each hour of multiple days and a bar graph that depicts the sum of the hourly data for each of the days.

Figure 1:
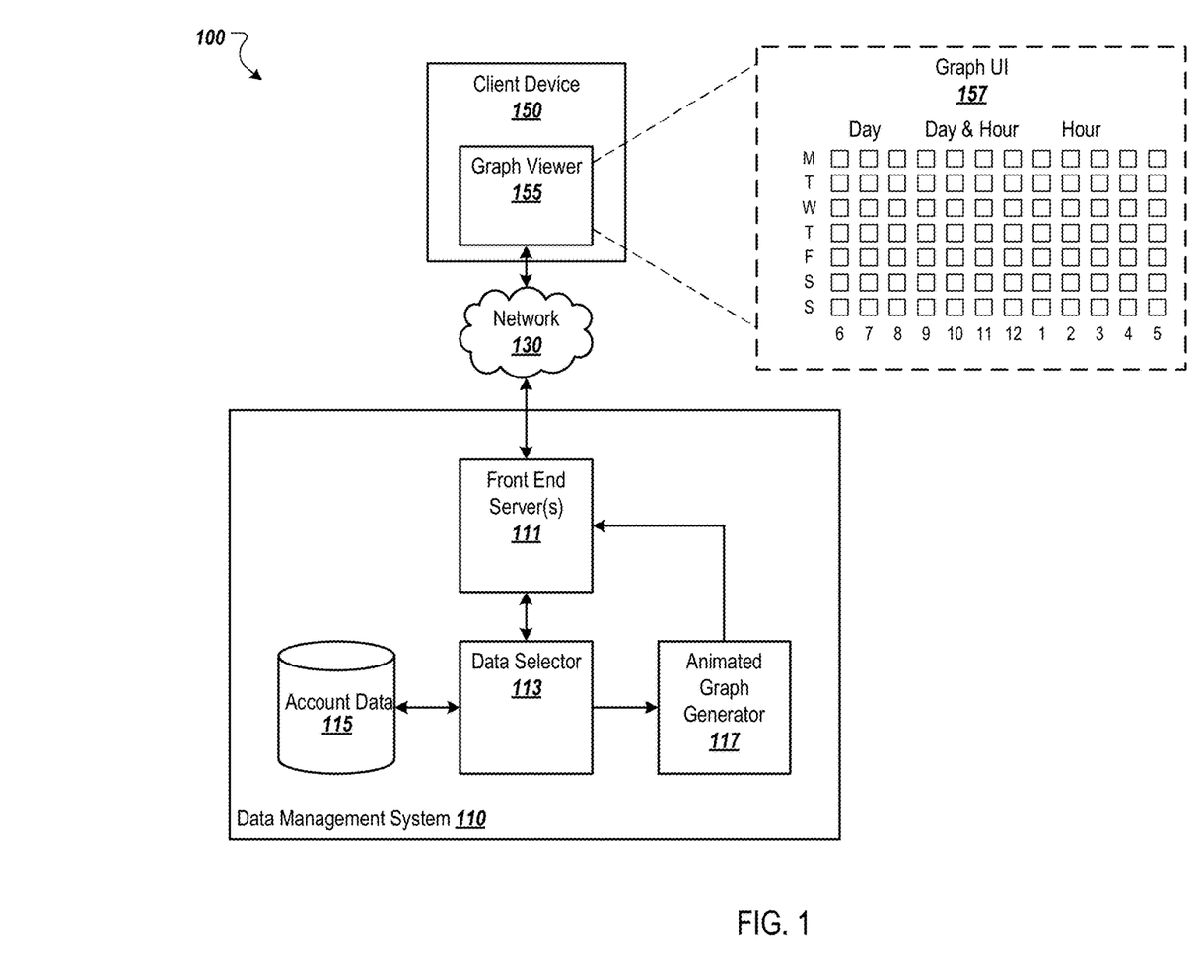
FIG. 1 is an environment in which a data management system provides animated graphs.

FIG. 1 is an example environment 100 in which a data management system 110 provides animated graphs. For example, the data management system 110 may provide animated graphs to client devices, e.g. the client device 150, in response to requests received from the client devices. The data management system 110 can send the animated graphs over a data communication network 130, e.g., a local area network (LAN), a wide area network (WAN), a mobile communication network, the Internet, or a combination thereof. The network 130 can include servers, hubs, routers, switches, interface devices, transmission media, and other networking components that enable devices to send and receive data to other devices.

A client device 150 is an electronic device that is capable of requesting and receiving electronic resources and other data over a network 130. Example client devices 150 include personal computers, mobile communication devices (e.g., smartphones, tablet computing devices, and/or smart watches), and other devices that can send and receive data over the network 130. A client device 150 typically includes a user application, such as a web browser, to facilitate the sending and receiving of data over the network 130. The web browser can enable a user to interact with text, images, videos, music, and other information typically located on a web page at a website.

A client device 150 can include other applications, e.g., native applications developed for a particular type of device or for a particular platform. For example, the client device 150 includes a graph viewer 155 that presents animated graphs in animated graph user interfaces 157. The graph viewer 150 may be implemented in a web browser, a native application, or another type of application program. As described in more detail below, the animated graphs can animate transitions between different types of graphs (e.g., between bar graphs and heat maps) or between other different views of the data.

The data management system 110 can manage data for users and/or organizations and provide the data for presentation to the users, e.g., in user interfaces and animated graphs generated by the data management system 110. For example, the data management system 110 can manage online account data for multiple different accounts of multiple different account holders. In a particular example, the data management system 110 can manage advertising account data for multiple different organizations. The systems and techniques described below can be applied to various other types of data.

The account data managed by the account management system 110 can include any data related to an account, such as performance data for content items (e.g., number of impressions, click through rates, conversion rates, etc.), budget information for account holders, and/or content item distribution criteria. The account data for each account holder is stored in an account data storage device 115, which may include multiple data storage devices located in one or more data centers. The account data for each account holder may be stored separately and securely such that account data for one account holder is not provided to users of a different account holder.

At least a portion of the account data can be stored with data identifying a corresponding time or time period for the data. For example, data for an advertising campaign may include data specifying a number of impressions of a content item, a number of selections of the content item, a number of conversions resulting from presentations of the content item, and/or other appropriate campaign data. The data for each event (e.g., impression, selection, conversion, etc.) can include a designation of the time at which the event occurred. For example, if the content item was presented on a client device at 5:00 PM, the data for the impression can indicate that the impression occurred at 5:00 PM. In this way, the data can be filtered based on time and metrics associated with each time or time period can be determined. The account data can also be stored with data identifying other appropriate characteristics, such as a geographic location at which the event occurred or a type of device at which the event occurred. These characteristic data can be used to filter the account data and/or to present graphs of the data based on the characteristics.

The data management system 110 includes one or more front-end servers 111, a data selector 113, and an animated graph generator 117. The data selector 113 and the animated graph generator 117 can also be implemented in one or more servers. For example, the front-end server(s) 111, the data selector 113, and the animated graph generator 117 may be implemented in one or more servers located in one or more locations (e.g., data centers). The front-end server(s) 111, data selector 113, and animated graph generator 117 can communicate data between each other, for example, over a network.

The front-end server(s) 111 receive requests for data from client devices and provide the requested data to the client devices. The front-end server(s) 111 can act as an interface between client devices and the data selector 113 and the animated graph generator 117. For example, the front-end server(s) 111 can forward requests for data to the data selector 113. In turn, the data selector 113 can obtain the appropriate data from the account data storage device 115 and provide the data to the front-end server(s) 111. The front-end server(s) 111 can then provide the data to the client device that submitted the request.

The front-end server(s) 111 can also determine whether a received request is requesting an animated graph. For example, the request may specify that it is requesting an animated graph that depicts account data. If the front-end server(s) 111 determines that a request is requesting an animated graph, the front-end server(s) 111 can request an animated graph (or data that can be used to generate an animated graph) from the animated graph generator 117. The animated graph generator 117 can generate an animated graph (or data that be used to generate an animated graph) for the requested data and provide the animated graph or data to the front end server(s) 111. In turn, the front-end server(s) 111 provide the animated graph or data to the client device.

A request for an animated graph can specify the account data that is to be included in the graph. For example, the request may specify one or more types of performance data (e.g., number of impressions, selection rates, conversion rates, etc.). The request can also specify one or more data dimensions for the requested data. In general, the data dimensions of the request indicate how the data should be grouped or filtered for presentation in the animated graphs. For example, the data dimensions for which data can be requested can be time-based dimensions, geography-based dimensions, or other appropriate types of data dimensions.

A data dimension is a set of characteristic-based groups that are at a same hierarchical level and to which data belongs based on characteristics of the data. For example, a time-based data dimension may be days of the week with each day being a characteristic-based group. Data for events that occur on a particular day of the week belongs to the characteristic-based group for that day of the week. For example, selections of a content item that occur on Friday may belong to a group for Friday. A characteristic group for a day of the week may include data that occurred on that day for one week or for multiple weeks.

Each group for a time-based data dimension can correspond to a particular time period at the data dimension's hierarchical level. An example hierarchy of data dimensions may include months of the year at one level, days of the week at another level, and hours of the day another level. In this example, the days of the week data dimension is a sub-data dimension of the months of the year data dimension. Similarly, the hours of the day data dimension is a sub-data dimension of the days of the week data dimension. In a geography-based data dimension example, individual cities may be a sub-data dimension of a data dimension for states.

Individual pieces of data can belong to multiple groups at multiple different hierarchical levels. For example, a conversion that occurs on a Friday in October may belong to a group for October in the months of the year data dimension and also belong to a group for Friday in the days of the week data dimension.

An animated graph can animate the transition between different views of data. In some implementations, an animated graph animates the transition between (e.g., back and forth between) a first view that presents single dimensional data and a second view that presents multi-dimensional data. A view of single dimensional data can depict data for a single dimension only, e.g., for days of the week only. For example, single dimensional data can be presented using a bar graph with a bar for each characteristic-based group of a single data dimension. In a particular example, a bar graph can present the number of selections of a content item that have occurred on each day of the week. In this example, the bar graph can include a bar for each day of the week and the height (or length) of the bar for a particular day can represent the number of impressions of the content item that occurred on the particular day.

A view of multi-dimensional data can depict data for two or more data dimensions, e.g., for days of the week and hours of the day. Multi-dimensional data can be presented using a heat map. A heat map is a graph in which individual values are represented by a colored visual graph element. For example, a heat map can include a matrix of visual graph elements that each depicts a color based on the value of data that the visual graph element represents. The color of each visual graph element can vary based on the value of the data represented by the visual graph element. For example, the darkness of the color of a visual graph element may increase with an increase in the value represented by the visual graph element.

An example of a heat map is illustrated in the animated graph user interface 157. In this example, the heat map includes a matrix that has a row for each day of the week and a column for individual hours of the day. The example heat map includes a square-shaped visual graph element at the intersection of each row and column. In other heat maps, the visual graph elements may have other geometric shapes, e.g., circles, rectangles, etc. The visual graph element at the intersection of a particular row and a particular column represents the value of the data being presented in the animated graph user interface 157 for the day of the week that corresponds to the particular row and the hour of the day that corresponds to the particular column. For example, the visual graph element at the intersection of the row for Monday and the column for 6:00 AM represents the value of the data corresponding to 6:00 AM on Monday (or a time period that includes 6:00 AM on Monday such as 6:00 AM-7:00 AM on Monday). If the data presented in the heat map is a number of impressions of a content item, this example visual graph element would have a color that is based on the number of times the content item was presented on one or more Mondays at 6:00 AM (or between 6:00 AM and 7:00 AM).

The animated graph generator 117 can generate animated graphs that animate the transition between different views of data, e.g., between different types of graphs and/or between views of single and multi-dimensional data. For example, the animated graph generator 117 can generate animated graphs that animate the transition between heat maps that present multi-dimensional data and bar graphs that present single dimensional data.

In general, the transition between two views of data can be animated by moving visual graph elements from their respective locations in one view to their respective locations in the other view. For example, the heat map illustrated in the animated graph user interface 157 can be transitioned to a bar graph that includes a bar for each day of the week by moving the visual graph elements in each row to form a bar for the row. For example, the visual graph elements can be arranged side by side or on top of each other to form the bar. The length of the bar for a particular day of the week can be based on the total value of the data for the day of the week corresponding to the particular row. For example, the length of the bar for Monday may be the sum of the values represented by the visual graph elements included in the row for Monday in the heat map. Thus, the distance and direction that the visual graph elements in a particular row will move may be based on the total value of the data for the day of the week corresponding to the row. Examples of animated transitions between heat maps and bar graphs are illustrated in FIGS. 2A-2C and 3A-3C and described in more detail below.

In some implementations, the animated graph generator 117 generates data that presents the graphs and the transitions between the graphs. For example, the animated graph generator 117 may generate a visual graph element for each individual piece of multi-dimensional data that will be presented in a heat map. For each graph element, the animated graph generator 117 can also generate data that specifies the characteristic-based groups to which the visual graph element belongs and the value of the visual graph element. For example, a request may be a request for an animated graph of impression counts for a content item for days of the week and hours of the day. In this example, each visual graph element may be assigned a day of the week and an hour of the day based on the day of the week and hour of the day. Each visual graph element may also be assigned a value based on the number of impressions that have occurred for its assigned day of the week and hour of the day. In this way, the graph viewer 155 can arrange the visual graph elements in a graph based on the day of the week and/or hour of the day assigned to each visual graph element. In addition, the graph viewer 155 can also present each visual graph element in an appropriate color based on the value assigned to the visual graph element. For example, the animated graph generator 117 may assign a color to each visual graph element based on the value that the visual graph element represents. In another example, the graph viewer 115 may be configured (e.g., by code provided by the animated graph generator 117) to depict in visual graph element based in its value.

In some implementations, each visual graph element is implemented as a Document Object Model (DOM) element. Each DOM element can include the day of the week, hour of the day, value, and/or color assigned to the visual graph element that the DOM element represents. The DOM elements may be included in a DOM tree that is provided to the client device. The DOM elements can be manipulated based on computer-readable code, e.g., routines, methods, and/or scripts.

The animated graph generator 117 can also provide the code (e.g., routines, methods, and/or scripts) that cause the graph viewer 155 to present various data views or graphs using the visual graph elements and to animate transitions between the various data views or graphs. The animated graph generator 117 can provide the code along with the visual graph elements (e.g., DOM elements) to the front-end server(s) 111. In turn, the front-end server(s) can provide the code along with the visual graph elements to the client device 150 for presentation to a user of the client device 150.

Figure 2A:
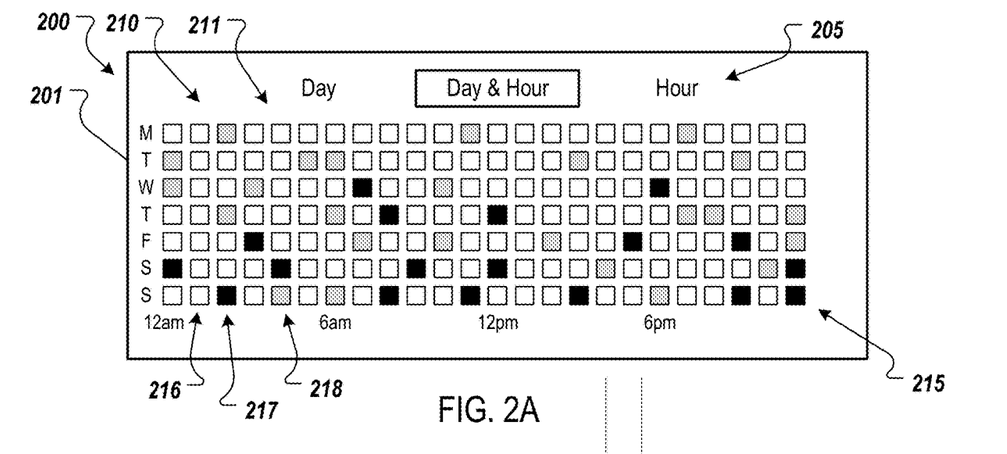
FIGS. 2A-2C are screenshots illustrating an example animated transition between two graphs.
Figure 2B:
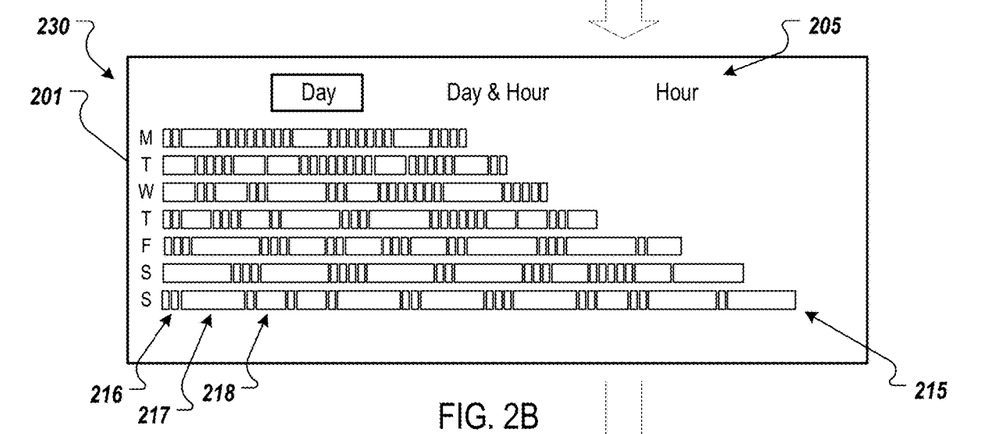
Figure 2C:
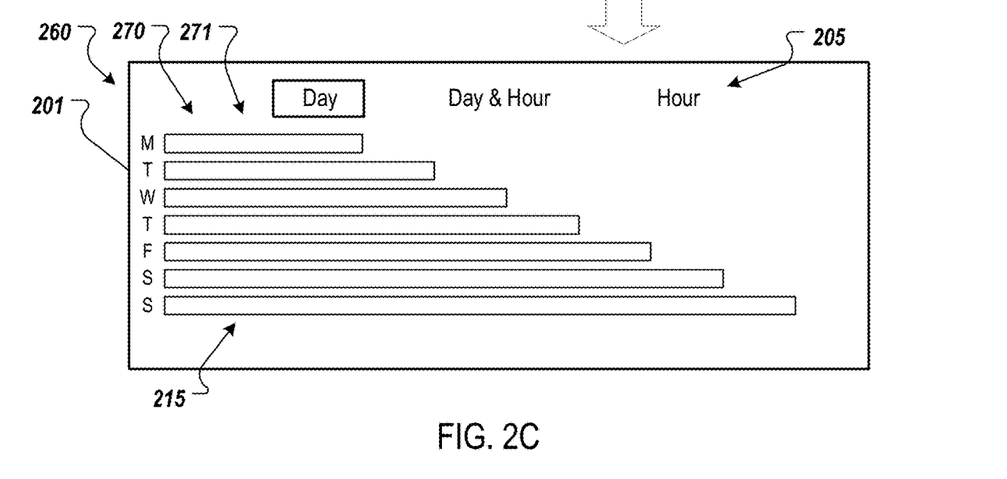

FIGS. 2A-2C are screenshots 200, 230, and 260 illustrating an example animated transition between two graphs 210 and 270. The screenshot 200 of FIG. 2A illustrates a user interface 201 that presents a graph 210 that includes a heat map 211. The heat map 211 visually depicts different values of data for multiple time periods and multiple different sub-time periods of each time period. In particular, the time periods are days of the week and the sub-time periods are hours of the day. Each row of the heat map 211 corresponds to a day of the week and each column of the heat map 211 corresponds to an hour of the day.

The heat map 211 includes visual graph elements 215 arranged in the rows and columns of the heat map 211. Each visual graph element 215 is located at the intersection of a row and a column. The visual graph element 215 located at the intersection of a particular row and a particular column represents the value of data being presented in the graph 210 for the day that corresponds to the particular row and the hour of the day that corresponds to the particular column. For example, the color of each visual graph element 215 may be based on the value that the visual graph element represents. In particular, visual graph element 216 is white, visual graph element 217 is black, and visual graph element 218 is a shade of gray. In this example, the darkness of each visual graph element 215 (along a grayscale) may increase with an increase in value represented by the visual graph element 215. Thus, the visual graph element 217 may represent the highest value among the three visual graph elements 216-218 and the visual graph element 216 may represent the lowest value between the three visual graph elements 216-218.

Although the visual graph elements 215 are illustrated as being spaced apart, the edges of visual graph elements 215 adjacent visual graph elements 215 may touch one another. In addition, the visual graph elements 215 may not include borders in some implementations to provide a continuous view of the data.

The user interface 201 includes a menu 205 than enables a user to switch between presentations of different graphs. For example, the user interface 201 may be updated to present the heat map 211 in response to a user selection of "Day & Hour" in the menu 205. The user interface 201 may also be updated to present a bar graph of data for each day of the week in response to a user selection of "Day" in the menu 205. This bar graph is illustrated in the screenshot 260 and includes a horizontal bar for each day of the week. Similarly, the user interface 201 may be updated to present a bar graph of data for each hour of the day in response to a user selection of "Hour" in the menu 205. The bar graph for the hours of the day may include a vertical bar for each hour.

The screenshot 260 of FIG. 2C illustrates the user interface 201 presenting a graph 270 that includes a bar graph 271 for the days of the week. The example bar graph 271 includes a horizontal bar for each day of the week. The length of each bar can be based on the sum of the values for the day of the week that the bar represents. For example, the length of the bar for Monday may be based on the sum of the values represented by the visual graph elements in the row for Monday. The length of the bar for a row may be directly proportional to the sum of the values represented by the visual graph elements in that row.

Each bar may depict a particular color. For example, the colors of each bar may be the same. In another example, the color of each bar may be different or vary based on the data for each day of the week. For example, the color of each bar may be based on the sum of the values represented by the visual graph elements in the row of the bar.

The screenshot 230 of FIG. 2B illustrates a point in time during the transition from the heat map 211 of FIG. 2A to the bar graph 271 of FIG. 2C. The transition can be animated, for example, by moving the visual graph elements 215 of each row of the heat map 211 to form a bar of the bar graph 271. For example, the visual graph elements in the row for Monday may move within the row for Monday to form the bar for Monday in the bar graph 271. The graph viewer 155 of FIG. 1 may cause the visual graph elements to move based on code received from the front-end server(s) 111 of FIG. 1.

In some implementations, the visual graph elements of a row may move to form the bar of that row such that it appears that the visual graph elements are collapsing into the row. For example, the bar for Monday is the shortest bar in the bar graph 271. During the transitioning, at least a portion of the visual graph elements in the row for Monday may move to the left until all of the visual graph elements in the row for Monday are within the area consumed by the bar for Monday in the bar graph 271. The visual graph elements that are already within the area consumed by the bar for Monday while presented in the heat map 211 may not have to move, or may only move to the left slightly to fill any gaps between visual graph elements. However, the visual graph elements to the right of the area consumed by the bar for Monday may move from their position in the heat map 211 until the visual graph elements are within the area consumed by the bar for Monday. For example, the right-most visual graph element in the row for Monday may move from its position in the column for 11:00 PM to within the area consumed by the bar for Monday (e.g., approximately at or to the left of the location where the column for 6:00 AM is in the heat map 211).

Depending on the length of the bar, some visual graph elements may move to the right. For example, if the length of the bar for a particular row extends past the location of the right-most visual graph element for the particular row in the heat map 211, at least a portion of the visual graph elements in the particular row may move to the right to form the bar for the particular row.

In some implementations, the transition may be animated such that shorter bars appear to collapse faster than longer bars. In this example, visual graph elements in rows that have shorter bars may move faster to their final position in a bar than visual graph elements in rows that are longer. In this way, the difference in collapse speeds highlights to users the difference in values between shorter and longer bars.

The transition from the heat map 211 to the bar graph 271 may occur within a transition time period. For example, the transition time period may be one second, two seconds, or another appropriate time period. Each visual graph element that moves from its location in the heat map 211 to a different location in the bar graph 271 may complete its move during the transition time period. The speed at which a visual graph element moves may be based on the distance that the visual graph element moves from its location in the heat map 211 and its location in the bar graph 271. For example, the speed may be determined such that each visual graph element moves at a constant speed during the transition time period. Or, the speed at which a visual graph element may increase or decrease over the course of the transition time period.

In some implementations, the transition may be animated such that it appears that the visual graph elements that move during the transition appear to move together. For example, each visual graph element in a particular row that is not completely within the area consumed by the bar for that row (e.g., each visual graph element that, while presented in the heat map 211, is to the right of the bar of the bar graph 271 for the row) may move at the same speed until each of the visual graph elements are within the area consumed by the bar.

The transition may be animated such that visual graph elements that move during the transition stay connected during the transition. For example, each visual graph element in a particular row that is not within the area consumed by the bar for that row (e.g., each visual graph element that, while presented in the heat map 211, is to the right of the bar of the bar graph 271 for the row) may move together at the same speed. In another example, the right-most visual graph element may move to the left until it is adjacent to or touching the visual graph element to its left. Then, these two visual graph elements can move to the left together until they are adjacent to the next visual graph element to the left, and so until all of the visual graph elements in the row are connected and within the area consumed by the bar for the row.

In some implementations, the size of the visual graph elements (e.g., the width of the visual graph elements may change during the transition. For example, the bar for Sunday extends slightly to the right of where the visual graph element for 11:00 PM on Sunday is located. The visual graph elements for Sunday can widen to fill the gaps and at least one of the visual graph elements for Sunday can move to the right so that the bar extends to the proper length.

The size of the visual graph elements can change during the transition based on the value represented by the visual graph elements. For example, the size of a visual graph element in a particular row may change based on its value relative to the value represented by each other visual graph element in the row or the sum of the values of the visual graph elements in the row. For example, visual graph elements that contribute little to the bar for the row (e.g., those representing smaller values compared to other visual graph elements in the row) may shrink in size during the transition. Similarly, visual graph elements that contribute a lot to the bar for the row (e.g., those representing larger values compared to other visual graph elements in the row) may grow in size during the transition. In this way, the relative contribution of each visual graph element to the bar for the row can be visually expressed to the user.

In a particular example, the visual graph element 217 represents a higher value than the visual graph element 216 and the visual graph element 218. In this example, the visual graph element 217 has widened during the transition such that the visual graph element 217 is wider than the visual graph elements 216 and 218. Similarly, the visual graph element 216 represents a lower value than the visual graph elements 217 and 218. The width of the visual graph element 216 has compressed during the transition such that the visual graph element 216 is thinner than the visual graph elements 217 and 218.

The adjustment to the size of a visual graph element during the transition can be based on a comparison between the value that the visual graph element represents and the sum of the values represented by the visual graph elements in the row (or column). In some implementations, the graph viewer 155 (or the animated graph generator 117) of FIG. 1 may determine, for each visual graph element 215, a final size of the visual graph element in its respective bar based on a comparison between the value that the visual graph element represents and the sum of the values represented by the visual graph elements in the row (or column). For example, the final size may be based on (e.g., directly proportional to) a ratio between the value represented by the visual graph element and the sum. In this example, a visual graph element that contributes more than half of the sum would grow to a size greater than half the size of the bar.

Each visual graph element may change in size from its original size in the heat map 211 to its respective size in the bar graph 271 over the course of the transition time period. For example, each visual graph element may widen or compress at a constant speed (or a variable speed) such that it starts changing in size at the start of the transition time period and reaches its final size at the end of the transition time period.

The color of the visual graph elements can also change during the transition from the heat map 211 to the bar graph 271. In the heat map 211, visual graph elements that represent different values may have a different color. In the bar graph, the bar for a particular row may be a constant color throughout the bar. Thus, if there are different color visual graph elements in a particular row, the color of one or more visual graph elements in the row may be adjusted to match the final color of the bar. In some implementations, the color of a visual graph element in a particular row may be adjusted to gradually change during the transition time period from its color in the heat map 211 to the color of the bar for the particular row.

A similar technique can be used to animate the transition from the bar graph 271 to the heat map 211. For example, the user interface 201 may be updated to present the heat map 211 in response to a user selection of "Day & Hour" in the menu 205 while the bar graph 271 is presented in the user interface 201. During this transition, the visual graph elements in a row may move from their position in the bar for the row to their respective positions in the heat map 211. For example, at least a portion of the visual graph elements in the row for Monday may move to the right. In particular, the visual graph element for 11:00 PM Monday may move from its location in the bar of the bar graph 271 to a location where the row for Monday intersects with the column for 11:00 PM in the heat map 211.

Similarly, the size and color of at least a portion of the visual graph elements may be adjusted during the transition from the bar graph 271 to the heat map 211. For example, each visual graph element in a row of the heat map 211 for a particular day may have a different color due to different values represented by the visual graph elements. In this example, the color of a visual graph element may be adjusted to gradually change from the color of the bar to its color in the heat map 211 during the transition time period. As described above, some visual graph elements in a bar may be wider than other visual graph elements in the bar based on their relative values. The size of the visual graph elements may change during the transition time period such that each visual graph element in the heat map 211 has a same size.

Figure 3A:
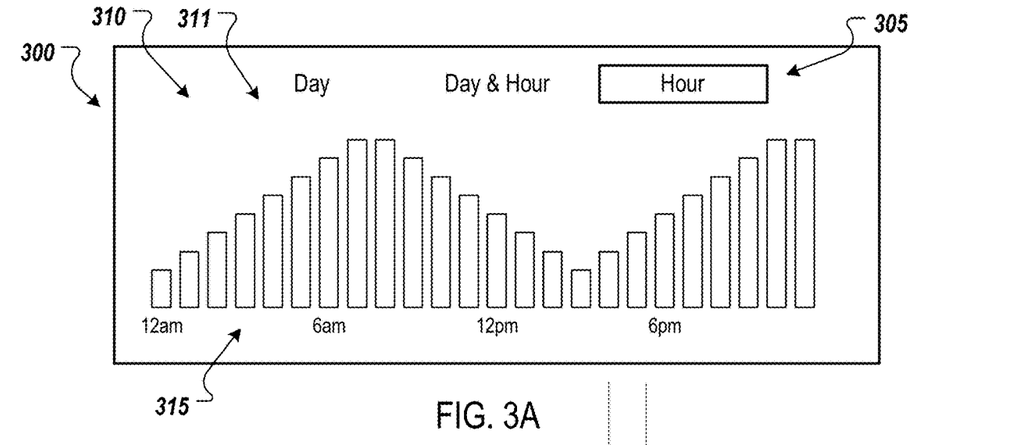
FIGS. 3A-3C are screenshots illustrating an example animated transition between two graphs.
Figure 3B:
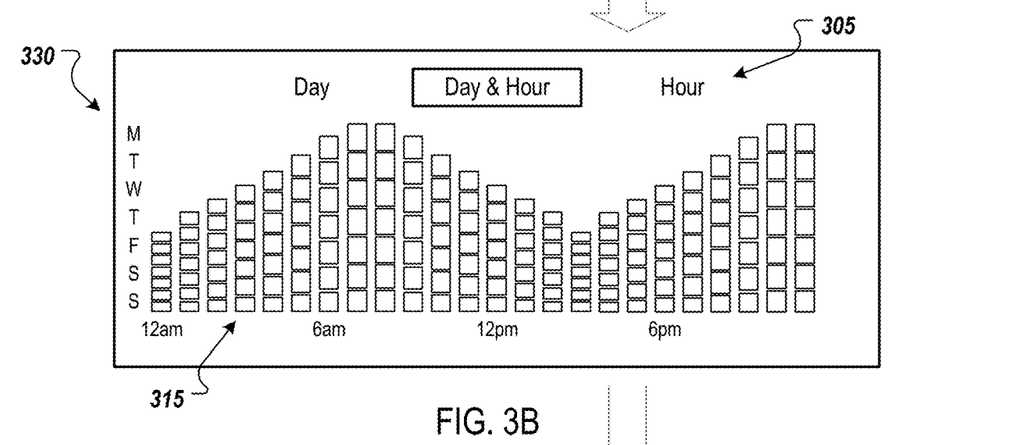
Figure 3C:
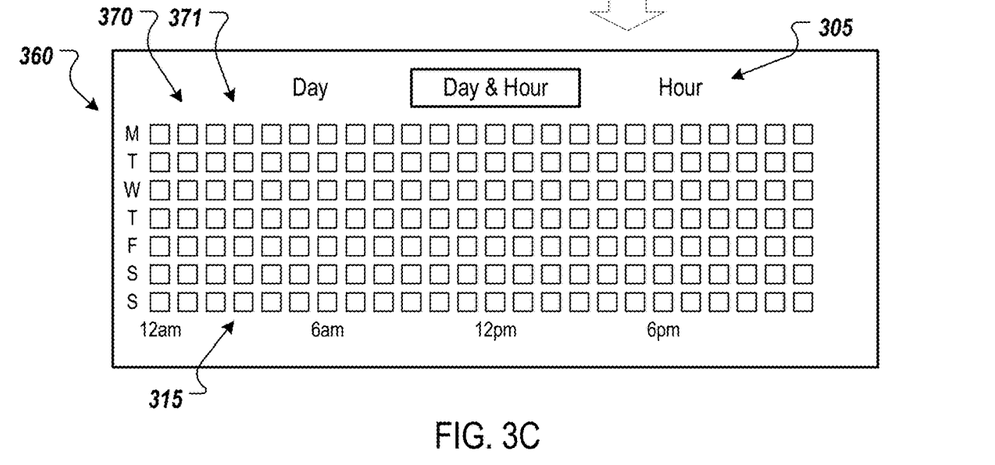

A similar technique can be used to animate the transition between a view of a heat map and a bar graph for the hours of the day. For example, FIGS. 3A-3C are screenshots 300, 330, and 360 illustrating an example animated transition between two graphs 310 and 370. The screenshot of FIG. 3A illustrates a user interface 301 that presents a graph 310 that includes a bar graph 311 for the hours of the day. The example bar graph 371 includes a vertical bar for each hour of the day. The height of each bar can be based on the sum of the values for an hour of the day that the bar represents. For example, the height of the bar for 12:00 AM may be based on the sum of the values represented by the visual graph elements in the column for 12:00 AM. The height of a bar may be directly proportional to the sum of the values represented by the visual graph elements in that column. Similar to the bars of the bar graph 271 of FIG. 2C, the bars of the bar graph 371 may be the same color or different colors (e.g., based on the sum of the values represented by the visual graph elements in the column for the bar).

The bars of the bar graph 311 can be formed by visual graph elements for each hour of the day and each day of the week. For example, the screenshot 360 of FIG. 3C illustrates the user interface 301 presenting the graph 370 that includes a heat map 371. The heat map 371 visually depicts different values of data for days of the week and hours of the day, similar to the heat map 211 of FIG. 2A.

The heat map 371 includes visual graph 315 elements arranged in the rows and columns of the heat map 371. Each visual graph element 315 is located at the intersection of a row and a column. The visual graph element 315 located at the intersection of a particular row and a particular column represents the value of data being presented in the graph 370 for the day that corresponds to the particular row and the hour of the day that corresponds to the particular column. For example, the color of each visual graph element 315 may be based on the value that the visual graph element represents.

The user interface 301 includes a menu 305 than enables a user to switch between presentations of different graphs. For example, the user interface 301 may be updated to present the bar graph 311 in response to a user selection of "Hour" in the menu 305. The user interface 301 may also be updated to present the heat map 371 in response to a user selection of "Day & Hour" in the menu 305.

The screenshot 330 of FIG. 3B illustrates a point in time during the transition from the bar graph 311 of FIG. 3A to the heat map 371 of FIG. 3C. The transition can be animated, for example, by moving the visual graph elements 315 of each bar of the bar graph 311 to its respective location in the heat map 371. For example, the visual graph elements in the bar for 12:00 AM may move within the column for 12:00 AM until each visual graph element in the bar reaches its location in the heat map 371. The graph viewer 155 of FIG. 1 may cause the visual graph elements to move based on code received from the front-end server(s) 111 of FIG. 1.

In some implementations, the visual graph elements of a bar in a column may move to form the heat map such that is appears that the visual graph elements 315 are rising from the bar. For example, the visual graph elements 315 in the bar for 12:00 AM may separate rise to their respective positions in the heat map 371. In a particular example, the visual graph element for Monday at 12:00 AM may move up in the column from its location in the bar for 12:00 AM until it reaches the row for Monday.

In this example, the visual graph elements 315 in a column separate from one another as the visual graph elements 315 are spaced apart in the heat map 371. In some implementations, the visual graph elements 315 may not be separated in the heat map 371. For example, the bottom of the visual graph element for Monday at 12:00 AM may tough the top of the visual graph element for Tuesday at 12:00 AM. In this example, visual graph elements 315 in a particular column that have a final location in the heat map 371 that is outside the area consumed by the bar for the column may be moved together from their positions in the bar graph 311 to their positions in the heat map 371. For example, these visual graph elements 315 in a particular column may move at the same speed until the visual graph elements.

As the bars of the bar graph 311 may have a height that is shorter than the location of the top visual graph elements of the heat map 371 (e.g., the location of the visual graph elements for Monday), at least a portion of the visual graph elements may either be disposed over another visual graph element in the bar or may be reduced in size in the bar. For example, the height of each visual graph element in a bar may be reduced such that the height of the bar corresponds to the sum of the values represented by the visual graph elements that form the bar and such that each visual graph element in the bar is visible 315. In a particular example, each visual graph element in a bar may have a same height and each visual graph element may be arranged on top of one another to extend the height of the bar. In this example, the height of each visual graph element may increase during the transition until it reaches its appropriate size for the heat map 371.

The size of each visual graph element 315 may also change during the transition from the bar graph 311 to the heat map 371 based on the value represented by each visual graph element 315. For example, the visual graph elements that form a particular bar may have different heights based on the value represented by the visual graph elements of the particular bar. In particular visual graph elements having a higher value may be taller. As the visual graph elements 315 have the same size in the heat map 371, the size of the visual graph elements 315 may change during the transition from their respective size in the bar graph 311 to their respective size in the heat map 371.

In some implementations, the transition may be animated such that the visual graph elements of shorter bars appear to rise faster than visual graph elements of taller bars. In this example, the visual graph elements in columns that have shorter bars may move faster to their final location in the heat map 371 than visual graph elements in columns that have taller bars.

The transition from the bar graph 311 may occur within a transition time period. Each visual graph element that moves from its location in the bar graph 311 to a different location in the heat map 311 may complete its move during the transition time period. The speed at which a visual graph element moves may be based on the distance that the visual graph element moves from its location in the bar graph 311 and its location in the heat map 371. For example, the speed may be determined such that the visual graph element moves at a constant speed during the transition time period. Or, the speed at which a visual graph element may increase or decrease over the course of the transition time period.

Similar to the visual graph elements 215 of FIGS. 2A-2C, the visual graph elements may change colors during the transition. For example, at least a portion of the visual graph elements 315 may gradually change during the transition time period from the color of its respective bar to a color that represents its value in the heat map 371.

A similar technique can be used to animate the transition from the heat map 371 to the bar graph 311. For example, the user interface 301 may be updated to present the bar graph 311 in response to a user selection of "Hour" in the menu 305 while the heat map 371 is presented in the user interface 301. During this transition, the visual graph elements 315 may move from their respective positions in the heat map 371 to their respective positions in their bar. This transition can be similar to the transition from the bar graph 271 to the heat map 211 illustrated in FIGS. 2A-2C and described above.

A transition between two same types of graphs or two same types of views of data can be animated using similar techniques as those described above. For example, a user may want to navigate from a view of the bar graph 271 of FIG. 2C in which daily data is presented to the bar graph 311 of FIG. 3A in which hourly data is presented. In this example, the user may select "Hour" from the menu 205 while the bar graph 271 is presented in the user interface 201. This transition may be animated by first animating a transition from the bar graph 271 to the heat map 211 of FIG. 2A, as described above with reference to FIGS. 2A-2C. Then, the transition may be animated by animating a transition from the heat map 211 (which may be the same as the heat map 371) to the bar graph 311 as described above with reference to FIGS. 3A-3C.

In some implementations, easing functions can be used to specify the rate of change in movement, color, and/or resizing of visual graph elements during a transition between two graphs. Each parameter can use the same or different easing functions. For example, a first easing function may be used to adjust the speed at which visual graph elements move from its position in a first graph to its position in a second graph while a different easing function is used to adjust the color of a visual graph element from its color in the first graph to its color in the second graph.

Figure 4:
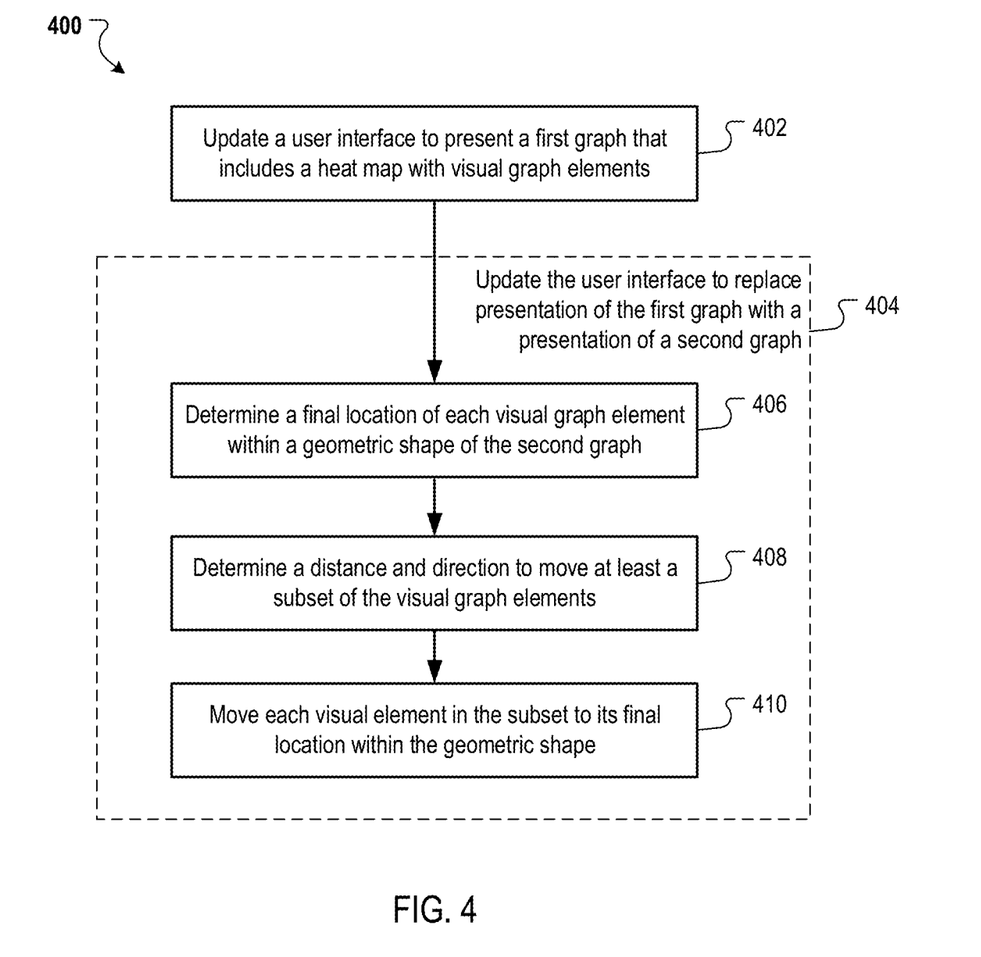
FIG. 4 is a flow chart of an example process for animating a transition between graphs.

FIG. 4 is a flow chart of an example process 400 for animating a transition between graphs. Operations of the process 400 can be implemented, for example, by one or more data processing apparatus, such as the client device 150 and/or the data management system 110 of FIG. 1. The process 400 can also be implemented by instructions stored on computer storage medium, where execution of the instructions by a data processing apparatus cause the data processing apparatus to perform the operations of the process 400.

A user interface is updated to present a first graph that includes a heat map (402). For example, the user interface may be updated in response to a user selection of a menu or a request for a heat map. The heat map can include visual graph elements (e.g., DOM elements). The visual graph elements can be arranged in a matrix of rows and columns to illustrate multi-dimensional data. For example, each row may correspond to a time period and each column may correspond to a sub-time period of the time period. In a particular example, each row may correspond to a day of the week and each column may correspond to an hour of the day. In another example, each row may correspond to a month of the year and each column may correspond to a day of the month. In yet another example, each column may correspond to a time period an each row may correspond to a sub-time period of the time period. For ease of subsequent discussion, the operations of the process 400 will described in terms of a matrix having rows that correspond to days of the week and columns that correspond to hours of the day.

The heat map can visually depict different values of data for each time period and the sub-time periods of each time period using different colors. Each visual graph element can be located at the intersection of a row and a column. The visual graph element located at the intersection of a particular row and a particular column represents the value of data being presented in the heat map for the time period (e.g., day) that corresponds to the particular row and the sub-time period (e.g., hour) that corresponds to the particular column. For example, the color of each visual graph element may be based on the value that the visual graph element represents.

The user interface is updated to replace the presentation of the first graph with a presentation of a second graph (404). For example, the user interface may be updated in response to a user selection of a menu or a request for a different graph or view of the data. The second graph can represent, for each time period, the sum of the different values for the time period. For example, the second graph can include a geometric shape (e.g., a rectangular bar) for each time period. The size of the geometric shape for a time period can be based on the sum of the different values for the time period. For example, the second graph may include a bar graph with vertical (or horizontal or some other direction) bars for each time period.

The update to the user interface can include constituent operations 406-410. These operations can animate the transition from the first graph to the second graph.

The final location of each visual graph element of the heat map is determined (406). The final location of a visual graph element may be its location in the geographic shape for the time period that the visual graph element represents. For example, the geometric shape for a particular day may be a rectangular bar that is formed by the visual graph elements that represent values for the particular day. The final location of the visual graph elements for the particular day may be within the bar for the particular day.

The final location of a visual graph element that represents a value for a particular time period (e.g., particular day) may be determined based on the sum of the different values for the particular time period, and thus the size of the geometric shape for the particular time period. For example, each visual graph element that represents a value for a particular day may be required to be located within the area of the geometric shape for the particular day. In addition, the visual graph elements may be arranged such that the visual graph elements form the entire area of the geometric shape.

The final location of a visual graph element may be based on the size of the visual graph elements relative to the size of the geometric shape for the time period. For example, the geometric shape may be a horizontal bar with a particular horizontal length. However, the visual graph elements for the time period result in a longer bar when the visual graph elements are positioned side by side. In this example, the size of the visual graph elements may be reduced so that when they are positioned side by side, the visual graph elements extend the same length as the horizontal bar. Thus, the final location of the visual graph elements can vary based on the amount the visual graph elements are reduced in size.

In another example, if the visual graph elements for the time period result in a longer bar when the visual graph elements are positioned side by side, some visual graph elements may be disposed over other visual graph elements. For example, the horizontal bar may be formed by a subset of the visual graph elements arranged side by side. The other visual graph elements may be moved to a location within the geometric shape that overlaps with one or more visual graph elements in the subset.

The final location of each visual graph element for a particular time period may be based on how the visual graph elements are to be arranged in the geographic shape for the particular time period. For example, if the geometric shape is a horizontal bar, the visual graph elements may be arranged side by side to extend the length of the bar. In this example, the visual graph elements may be arranged in the bar in the same horizontal order in which the visual graph elements are arranged in the heat map. For example, the left-most visual graph element in the heat map may remain the left-most visual graph element in the horizontal bar.

In another example, the final location of a visual graph element may be based on its location in the heat map and the amount of any adjustment to the size of the visual graph element. For example, the location of the visual graph element that is second from the left-most visual graph element in the geometric shape may depend on the size of the left-most visual graph element.

In another example, the final location of a visual graph element may be based on the value represented by the visual graph element and the value represented by other visual graph elements in the geometric shape. For example, the size of each visual graph element may be based on its value. In this example, the location of the visual graph element that is second from the left-most visual graph element in the geometric shape may depend on the value of the left-most visual graph element.

For at least a subset of the visual graph elements for each time period, a distance and direction in which the subset of visual graph elements are to move during the transition are determined (408). Some visual graph elements for a time period may not have to move, for example, if the visual graph elements are already located in the area of the graph that will be consumed by the geometric shape. However, some visual graph elements may be located outside of the area that will be consumed by the geometric shape. These visual graph elements may be moved in the direction of the geometric shape during the transition from presentation of the first graph to the presentation of the second graph.

The distance and direction that each visual graph element in the subset of visual graph elements is to move may be based on the location of the visual graph element in the first graph and the final location of the visual graph element in the second graph. For example, if the visual graph element is located on the right side of the heat map for a particular time period and the geometric shape for the time period does not extend to the location of the visual graph element in the heat map, the visual graph element may move to the left a particular distance to be within the geometric shape.

During a transition time period, each visual graph element in the subset is moved from its location in the first graph to its location in the second graph (410). The movement of a visual graph element may take the entire transition time period or a portion thereof. For example, a visual graph element may be shown to move throughout the transition time period, while another visual graph element may only move slightly at the beginning of the transition time period. The movement of the visual graph elements may be animated as described above with reference to FIGS. 2A-2C and 3A-3C. For example, the size and color of the visual graph elements may also change during the transition time period.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
generating, by one or more data processing apparatus, a heat map that represents different values of a metric for different subsets of data using different colors, each component of the heat map being presented in a respective color that represents a respective value for the component;
animating, by the one or more data processing apparatus, a transition of the heat map into a bar graph that includes a plurality of bars that each depict a corresponding value of the particular metric for a specified time period, including:
arranging, by the one or more data processing apparatus, components of the heat map that are in a same column or row together to form a bar having a length depicting the corresponding value of the particular metric for the specified time period; and
adjusting, by the one or more data processing apparatus and during the transition of the heat map into the bar graph, a color of each of one or more of the components from the respective color of the component that represents the value of the component to match a color of the bar created by arranging the components in the same column or row.

2. The method of claim 1, wherein arranging components of the heat map that are in a same column or row together to form the bar comprises moving the components at a speed that is based on the corresponding value of the particular metric represented by the bar.

3. The method of claim 1, further comprising determining a color of each bar based on a sum of the values for the components in the same column or row that are arranged to form the bar.

4. The method of claim 1, wherein adjusting the color of each of the one or more of the components from the respective color of the component that represents the value of the component to match a color of the bar created by arranging the components in the same column or row comprises gradually adjusting, during a transition time period during which the animating occurs, the color of each of the one or more components until the color of the each of the one or more components matches the color of the bar.

5. The method of claim 1, wherein arranging components of the heat map that are in a same column or row together to form the bar comprises adjusting a size of one or more of the components such that the bar has the length depicting the corresponding value of the particular metric for the specified time period.

6. The method of claim 1, wherein the adjusted size of each of the one or more components is based on the value for the component.

7. The method of claim 1, wherein arranging components of the heat map that are in a same column or row to form the bar comprises moving a group of the components of the heat map that are in the same column or row so that the components in the group appear to move together during the animating.

8. The method of claim 1, wherein, for each bar, the corresponding value of the particular metric for the specified time period to which the length of the bar corresponds is based on the respective value of each component in the same column or row that is arranged to form the bar.

9. A system comprising:
a data processing apparatus; and
a computer storage medium encoded with a computer program, the program comprising data processing apparatus instructions that when executed by the data processing apparatus cause the data processing apparatus to perform operations comprising:
generating a heat map that represents different values of a metric for different subsets of data using different colors, each component of the heat map being presented in a respective color that represents a respective value for the component;
animating a transition of the heat map into a bar graph that includes a plurality of bars that each depict a corresponding value of the particular metric for a specified time period, including:
arranging components of the heat map that are in a same column or row together to form a bar having a length depicting the corresponding value of the particular metric for the specified time period; and
adjusting, during the transition of the heat map into the bar graph, a color of each of one or more of the components from the respective color of the component that represents the value of the component to match a color of the bar created by arranging the components in the same column or row.

10. The system of claim 9, wherein arranging components of the heat map that are in a same column or row together to form the bar comprises moving the components at a speed that is based on the corresponding value of the particular metric represented by the bar.

11. The system of claim 9, wherein the operations comprise determining a color of each bar based on a sum of the values for the components in the same column or row that are arranged to form the bar.

12. The system of claim 9, wherein adjusting the color of each of the one or more of the components from the respective color of the component that represents the value of the component to match a color of the bar created by arranging the components in the same column or row comprises gradually adjusting, during a transition time period during which the animating occurs, the color of each of the one or more components until the color of the each of the one or more components matches the color of the bar.

13. The system of claim 9, wherein arranging components of the heat map that are in a same column or row together to form the bar comprises adjusting a size of one or more of the components such that the bar has the length depicting the corresponding value of the particular metric for the specified time period.

14. The system of claim 9, wherein the adjusted size of each of the one or more components is based on the value for the component.

15. The system of claim 9, wherein arranging components of the heat map that are in a same column or row together to form the bar comprises moving a group of the components of the heat map that are in the same column or row so that the components in the group appear to move together during the animating.

16. A non-transitory computer storage medium encoded with a computer program, the program comprising instructions that when executed by one or more data processing apparatus cause the data processing apparatus to perform operations comprising:

generating a heat map that represents different values of a metric for different subsets of data using different colors, each component of the heat map being presented in a respective color that represents a respective value for the component;

animating a transition of the heat map into a bar graph that includes a plurality of bars that each depict a corresponding value of the particular metric for a specified time period, including:

arranging components of the heat map that are in a same column or row together to form a bar having a length depicting the corresponding value of the particular metric for the specified time period; and adjusting, during the transition of the heat map into the bar graph, a color of each of one or more of the components from the respective color of the component that represents the value of the component to match a color of the bar created by arranging the components in the same column or row.

17. The non-transitory computer storage medium of claim 16, wherein arranging components of the heat map that are in a same column or row together to form the bar comprises moving the components at a speed that is based on the corresponding value of the particular metric represented by the bar.

18. The non-transitory computer storage medium of claim 16, wherein the operations comprise determining a color of each bar based on a sum of the values for the components in the same column or row that are arranged to form the bar.

19. The non-transitory computer storage medium of claim 16, wherein adjusting the color of each of the one or more of the components from the respective color of the component that represents the value of the component to match a color of the bar created by arranging the components in the same column or row comprises gradually adjusting, during a transition time period during which the animating occurs, the color of each of the one or more components until the color of the each of the one or more components matches the color of the bar.

20. The non-transitory computer storage medium of claim 16, wherein arranging components of the heat map that are in a same column or row together to form the bar comprises adjusting a size of one or more of the components such that the bar has the length depicting the corresponding value of the particular metric for the specified time period.

\* \* \* \* \*